United States Patent
Yan et al.

(10) Patent No.: US 11,842,738 B1
(45) Date of Patent: Dec. 12, 2023

(54) COMPUTING SERVICES USING EMBEDDINGS OF A TRANSFORMER-BASED ENCODER

(71) Applicant: Amazon Technologies, Inc., Seattle, WA (US)

(72) Inventors: Wenbo Yan, Redmond, WA (US); Ruiqi Luo, Kenmore, WA (US); Prathap Ramachandra, Kirkland, WA (US); Jingqian Zhao, Bellevue, WA (US); Kyung Jae Lee, Seattle, WA (US); Liu Yang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 298 days.

(21) Appl. No.: 17/208,069

(22) Filed: Mar. 22, 2021

(51) Int. Cl.
*G10L 15/00* (2013.01)
*G10L 15/26* (2006.01)
(Continued)

(52) U.S. Cl.
CPC ............ *G10L 15/26* (2013.01); *G06F 40/279* (2020.01); *G06N 20/00* (2019.01); *G10L 25/27* (2013.01)

(58) Field of Classification Search
CPC ......... G10L 15/26; G10L 25/27; G10L 15/22; G10L 2015/223; G10L 15/08;
(Continued)

(56) References Cited

U.S. PATENT DOCUMENTS

| 2019/0197109 A1* | 6/2019 | Peters | G06F 40/30 |
| 2020/0234698 A1* | 7/2020 | Selvaggi | G10L 15/22 |
| 2021/0248998 A1* | 8/2021 | Schairer | G10L 15/30 |

FOREIGN PATENT DOCUMENTS

WO WO-2020247231 A1 * 12/2020 ........... G06F 40/284

OTHER PUBLICATIONS

Wang L, Liu K, Cao Z, Zhao J, De Melo G. Sentiment-aspect extraction based on restricted boltzmann machines. In Proceedings of the 53rd Annual Meeting of the Association for Computational Linguistics and the 7th International Joint Conference on Natural Language Processing (vol. 1: Long Papers) 2015 (Year: 2015).*

(Continued)

*Primary Examiner* — Douglas Godbold
*Assistant Examiner* — Parker Mayfield
(74) *Attorney, Agent, or Firm* — Kilpatrick Townsend & Stockton LLP

(57) ABSTRACT

Techniques are described and relate to providing computing services using embeddings of a transformer-based encoder. In an example, a computer system generates, by using a machine learning (ML) transformer, an embedding vector based at least in part on text. The computer system stores the embedding vector and an association between the embedding vector and the text in a data store. Further, the computer system determines that a task is to be performed based at least in part on natural language understanding (NLU) of the text. The computer system receives the embedding vector from the data store based at least in part on the association between the embedding vector and the text. The task is performed based at least in part on the embedding vector after being received from the data store.

20 Claims, 9 Drawing Sheets

(51) Int. Cl.
*G06N 20/00* (2019.01)
*G06F 40/279* (2020.01)
*G10L 25/27* (2013.01)

(58) Field of Classification Search
CPC ... G10L 15/18; G10L 15/1822; G06F 40/279; G06F 40/20; G06F 40/30; G06F 40/40; G06N 20/00
See application file for complete search history.

(56) References Cited

OTHER PUBLICATIONS

Melamud O, McClosky D, Patwardhan S, Bansal M. The role of context types and dimensionality in learning word embeddings. arXiv preprint arXiv:1601.00893. Jan. 5, 2016. (Year: 2016).*

Abdelgawad L, Kluegl P, Genc E, Falkner S, Hutter F. Optimizing neural networks for patent classification. In Machine Learning and Knowledge Discovery in Databases: European Conference, ECML PKDD 2019, Würzburg, Germany, Sep. 16-20, 2019, Proceedings, Part III Apr. 30, 2020 (pp. 688-703). Cham: (Year: 2020).*

Bhathiya HS, Thayasivam U. Meta learning for few-shot joint intent detection and slot-filling. InProceedings of the 2020 5th International Conference on Machine Learning Technologies Jun. 19, 2020 (pp. 86-92). (Year: 2020).*

* cited by examiner

COMPUTING SERVICES USING EMBEDDINGS OF A TRANSFORMER-BASED ENCODER

BACKGROUND

As voice recognition technology improves, systems that employ such technology continue to proliferate. Some systems employ what is referred to as near-field voice recognition where a user speaks into a microphone located on a hand-held device, such as a remote control or mobile device. Other systems employ far-field voice recognition where a user can speak to a device while the user is within the general vicinity of the device, e.g., within the same room, but not necessarily in close proximity to or even facing the device. Both far-field devices and near-field devices can be deployed to provide user interfaces to various computing services.

BRIEF DESCRIPTION OF THE DRAWINGS

Various embodiments in accordance with the present disclosure will be described with reference to the drawings, in which.

DETAILED DESCRIPTION

Figure 1:
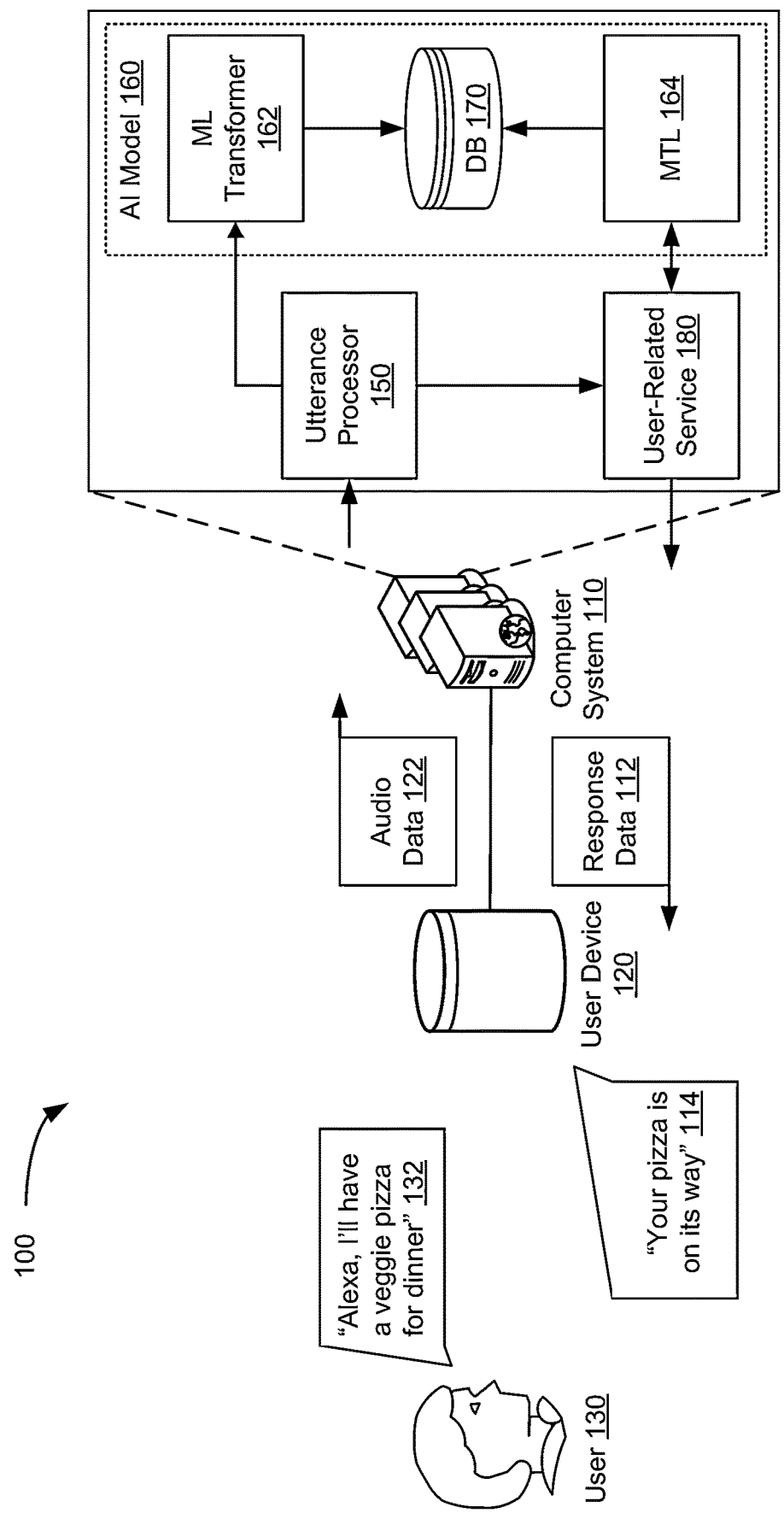
FIG. 1 illustrates an example of a computing environment in which natural language processing is performed to provide computing services, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed, among other things, to computing services using embeddings of a transformer-based encoder. In an example, input is received and includes natural language text. Natural language processing is applied thereto to initiate a relevant computing service. The natural language processing can involve a transformer-based encoder, such as a machine learning (ML) transformer that generates embedding vectors from the natural language text. The natural language processing can also involve performing one or more ML tasks. Performing an ML task can use one or more of the embedding vectors as an input to a multi-task layer (MTL). Relative to performing an ML task(s), generating the embedding vectors is generally more computationally intense and necessitates a larger processing latency, resulting in constraints on how the ML transformer can be deployed.

To improve the user perceived latency and allow flexibility and scalability in the deployment, embodiments of the present disclosure involve pre-computing embedding vectors, whereby these embedding vectors are stored along with related metadata in a data store. The pre-computation can occur as soon as the natural language text is available and need not be delayed until other natural language processing is performed thereon (e.g., natural language understanding (NLU). Upon the need to perform an ML task (e.g., after performing NLU and determining that the ML task is to be initiated), the relevant embedding vector(s) is determined based on the metadata, retrieved from the data store, and input to the MTL.

In an illustration, consider the use case of a voice controlled device (VCD), such as a smart speaker, communicatively coupled with a computing cloud to provide personal assistant computing services (e.g., completing an online purchase, listening to music, scheduling an appointment, and the like). The VCD can detect a user utterance requesting a particular personal assistant computing service (e.g., "I'll have pizza for dinner"), and generate and send the corresponding audio data to the computing cloud. The computing cloud can include a language processing system that performs automatic speech recognition (ASR) on the audio data to generate text, and that performs NLU processing on the text to generate a machine-readable format understanding thereof. Given this understanding, the particular personal assistant computing service is invoked (e.g., an application programming interface (API) call is made to a shopping service, where this API call identifies a user account and tokens from the text (e.g., "pizza")).

To provide this service, an intent (e.g., "to purchase") and an entity (e.g., "a food category") need to be identified. Accordingly, intent classification and named entity recognition are two examples of ML tasks that would be invoked to provide the particular personal assistant computing service. To perform these tasks, embedding vectors are fetched from a data store and are input to an MTL trained to perform multiple tasks, including intent classification and named entity recognition. These embedding vectors are computed by an ML transformer and stored in the data store at the earliest opportunity, such as soon as the text is output from the ASR process. In this way, rather than waiting until after the NLU process is complete to generate the embedding vectors, the ML transformer generates the embedding vectors in parallel to the NLU process. In this way, the overall user perceived latency (e.g., from the time the user utterance is made to the time a response is presented back by the VCD) is reduced. The embedding vectors are retrieved from the data store and input to the MTL. The output of the MTL indicates the intent (e.g., "to purchase") and the entity (e.g., the "food category"). This output becomes input to the particular personal assistant computing service that then completes the processing (e.g., generates a purchase order to identifies particular shoes and the user account) and sends a response to the VCD for presentation thereat (e.g., "your pizza has been ordered").

FIG. 1 illustrates an example of a computing environment 100 in which natural language processing is performed to provide computing services, according to embodiments of the present disclosure. As illustrated, the computing environment 100 includes a computer system 110 communicatively coupled (e.g., via one or more data networks) with a user device 120. The computer system 110 hosts different computing services, including natural language processing services and user-related services that can be initiated and interacted with via the user device 120. For instance, a user 130 may operate the user device 120 to request a user-related service. The user device 120 may send data about the request to the computer system 110. In turn, depending on the type of data, the computer system 110 may perform natural language processing thereon and then invoke the requested user-related service. A response is sent back from the computer system 110 to the user device 120 for presentation to the user 130.

In an example, the computer system 110 may represent a set of hardware servers and/or virtualized servers hosted within hardware systems operated by a service provider. The computer system 110 may implement (e.g., as a set of cloud computing services) an utterance processor 150, an AI model 160, a data store 170 (e.g., a database or some other storage that stores data usable by the AI model 160), and a user-related service 180 (or, similarly, a plurality of such services). The AI model 160 may include an ML transformer 162 and an MTL 164.

The user device 120 may represent a computing device that includes a suitable memory(ies) storing computer-readable instructions and a suitable processor(s) for executing the computer-readable instructions. The computer-readable instructions may represent program code of an application available from the service provider. The application may support a voice-based interface at the user device 120, among other functionalities. In particular, upon a user utterance, the application may detect a wakeword from the user utterance, generate audio data 122 corresponding to the user utterance, and then send the audio data 122 to the computer system 110 for processing. The application may also present a text-to-speech (TTS) response based on the response data 112 from the computer system 110 upon the processing of the audio data 122. The user device 120 may also support other input and output modalities, such as a graphical user interface (GUI) for receiving user input and presenting the related response of the computer system 110. For instance, the user device 120 can be any of a smart speaker, a smart phone, a tablet, a laptop, a desktop, a wearable computing device, an internet of things (IoT) device, a smart appliance, or any other type of computing devices capable of providing a user interface and communicating with the computer system 110.

In operation, the user 130 provides a user utterance 132 (e.g., "Alexa, I'll have a veggie pizza for dinner"). The user device 120 may receive the user utterance 132 via an audio sensor (e.g., a microphone), detect the wakeword (e.g., "Alexa"), and generate the audio data 122 in response to detecting the wakeword. The audio data 122 may be an audio message that represents the detected user utterance. Although the use of a wakeword is illustrated in FIG. 1, the embodiments of the present disclosure are not limited as such. Instead, a particular user input may be received at the user device 120 without any wakeword, such as via a button click.

The user device 120 sends the audio data 122 to the computer system 110. This audio data 122 is input to the utterance processor 150 that generates text from the audio data 122 (e.g., {Alexa I Will Have Pizza For Dinner}, generates machine-readable format understanding from the text (e.g., "intent: shopping", "tokens: veggie, pizza, tonight"), and invokes the user-related service 180 based on machine-readable format understanding (e.g., a computing service to complete an online purchase).

Upon the text being generated, this text can also be input to the AI model 160. The ML transformer 162 generates embedding vectors based on the text. Generally, an embedding vector corresponds to at least a portion of the text. For instance, a first vector embedding can be generated from the entire text. A second vector embedding can be granted from a subset of the words in the text. As such, different embedding vectors can be generated from different combinations of the words included in the text. The embedding vectors are generated in the data store 170.

Upon the user-related service 180 being invoked, and to process the output of the utterance processor 150, the user-related service 180 may need to determine an intent classification and a named entity recognition. Accordingly, the MTL 164 is invoked (e.g., via an API call that includes data about the service to perform; this data can identify the audio data 122 and/or the text, by including an identifier of the audio data 122 or user utterance 132 and/or by including the text). The MTL 164 retrieves and processes particular embedding vectors from the data store 170 based on the data received from the user-related service 180. The output of the MTL 164 indicates an intent classification (e.g., "purchase") and a named entity recognition (e.g., "vegetarian pizza") and is provided to the user-related service 180. In turn, the user-related service 180 performs the next relevant steps (e.g., generates a purchase order that identifies the relevant user account and the type of pizza) and sends the response data 112 informing about the next steps to the user device 120 (e.g., the response data 112 is text: {Your Pizza Is On Its Way"}). The user device 120 presents this response data 122 to the user 130 (e.g., by using text-to-speech), the user device 120 presents an audio response 114 (e.g., "your pizza is on its way"). The above and other operations of the computer system 110 are further described in connection with the next figures.

Although FIG. 1 describes receiving audio data and performing natural language processing, embodiments of the present disclosure are not limited as such. For instance, unstructured data can be received. The unstructured data can be audio data corresponding to a user utterance. In this case, ASR can be performed on the audio data. Additionally or alternatively, the unstructured data can be natural language text input received at a GUI of the user device 120. In this case, the ASR processing can be skipped. In yet another illustration, structured data can be received. The structured data can be structured audio data (e.g., received as voice selections to pre-defined fields), whereby ASR is performed thereon, but NLU processing can be skipped. Additionally or alternatively, the structured data can be structured text (e.g., text input via GUI presenting pre-defined fields), whereby both ASR and NLU processing can be skipped. Regardless of the type of input data to the computer system 110, the AI model 160 may process text derived from the input data or that directly corresponds to the input data to generate and store embedding vectors for subsequent processing.

Furthermore, variations to the computing environment 100 are possible. In one example, some of the functionalities of the utterance processor 150 (e.g., ASR, or ASR and NLU) can be pushed to the user device 120. In another illustration, the ASR processing and an instance of the AI model 160 can be pushed to the user device 120.

Figure 2:
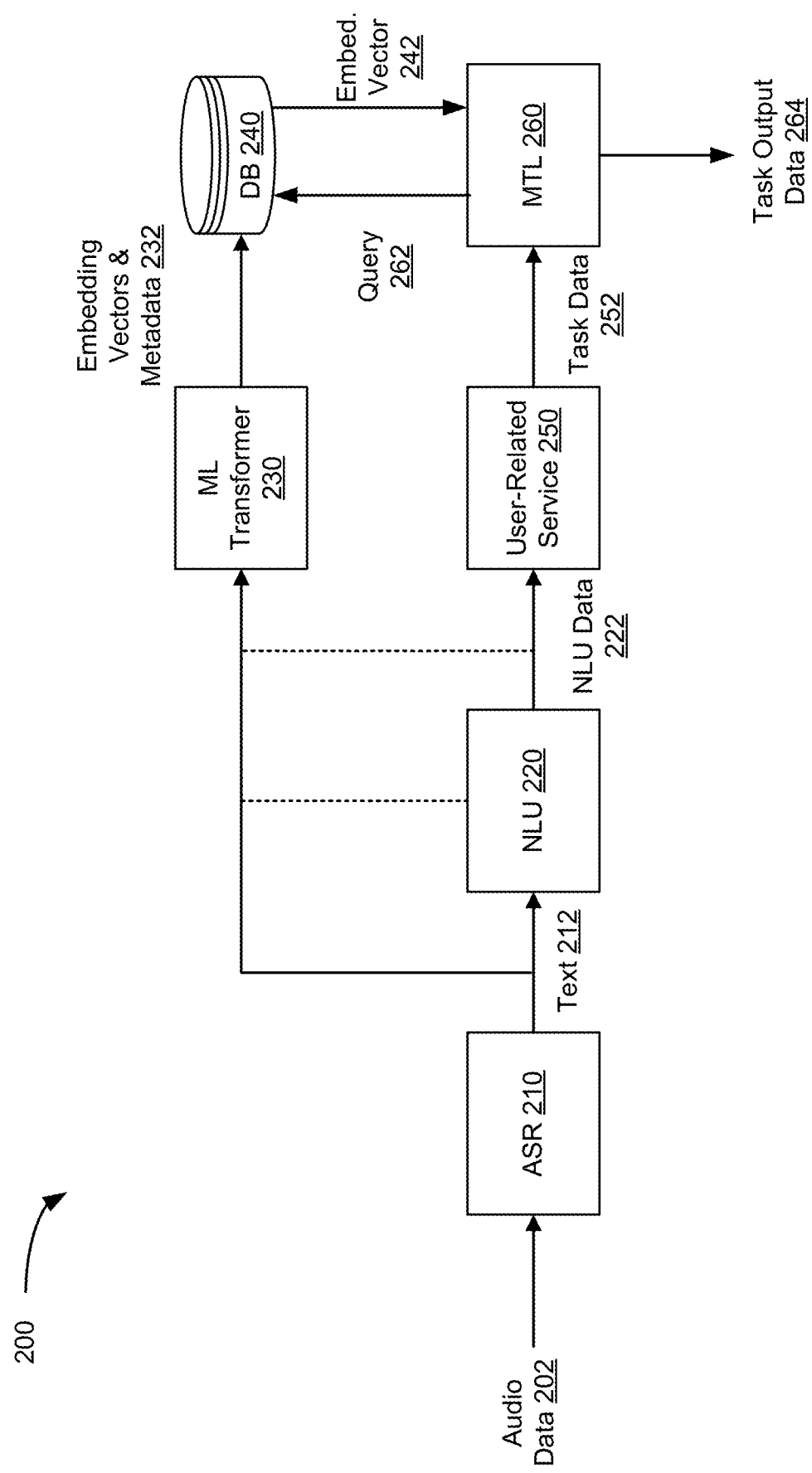
FIG. 2 illustrates an example of natural language processing that involves pre-computing embedding vectors and subsequently using one or more of the embedding vectors, according to embodiments of the present disclosure.

FIG. 2 illustrates an example of natural language processing 200 that involves pre-computing embedding vectors and subsequently using one or more of the embedding vectors, according to embodiments of the present disclosure. The natural language processing 200 involves ASR 210 and NLU 220 (which can be performed by the utterance processor 150 of FIG. 1). The output of the NLU 220 involves a user-related service 250 (similar to the user-related service 180 of FIG. 1). An ML transformer 230 (similar to the ML transformer 162 of FIG. 1) also generates embedding vectors that are stored in a data store 240 (similar to the data store 170 of FIG. 1). Upon being invoked by the user-related service 250, an MTL 260 (similar to the MTL 164 of FIG. 1) can retrieve one or more embedding vectors from the data store 240 to perform one or more tasks in support of the user-related service 250.

In an example, audio data 202 is input to the ASR 210 that outputs corresponding text 212. The text 212 is input to the NLU 220 that outputs corresponding NLU data 222. The NLU data 222 represents a machine-readable format understanding of the text 212. The specific understanding depends on the training and/or configuration of the NLU 220. For instance, the NLU 220 can be set up to determine an intent, tokens, and the like. In this case, the NLU data 222 includes the determined intent and tokens.

Based on the NLU data 222, the relevant user-related service can be selected. For instance, when the NLU data 222 indicates a shopping intent, an online shopping service is invoked. In comparison, when the NLU data 222 indicates a media intent, a media streaming service is invoked. Such user-relates services can be hosted as cloud computing services on the computer system 110 of FIG. 1.

Based on the selected user-related service 250, the MTL 260 can be invoked. For instance, the online shopping service may necessitate intent classification and named entity recognition to determine whether a user intends to make a purchase or to browse a catalog and to determine an item category or specific items of interest to a user. In comparison, the media streaming service may necessitate sentiment analysis in addition to intent classification and named entity recognition. In this way, this service can determine whether a user intends to stream media or add media to a media library, a particular media genre or media album, and a particular mood of the user that can influence the media to be provided. Intent classification, named entity recognition, and sentiment analysis are examples of ML tasks and other types of ML tasks are possible depending on the type of the user-related service. An ML task may also be referred to herein as a "task."

To invoke the MTL 260, an API call can be made thereto. The API call can include task data 252. The task data 252 can identify the particular task(s) that are of interest to the user-related service (e.g., intent classification, named entity recognition, sentiment analysis, etc.). Additionally or alternatively, the task data 252 can identify specific tokens (e.g., words from the text 212 or substitutes of these words) or position information of the words/tokens in the text 212 (e.g., the positions of the words within the text; these positions can be represented with slot identifiers) for which the task(s) are to be performed.

Rather than processing the words, the MTL 260 processes corresponding embedding vectors to perform tasks. As explained herein above, these embedding vectors can be pre-computed rather than being computed on the fly. Pre-computation can reduce the overall user perceived latency. Further, the pre-computation allows the offloading of the ML transformer processing to dedicated hardware, such as dedicated central processing units (CPUs) and/or graphics processing units (GPUs), such that this processing can be performed in a processing pipeline separate from that of the ASR 210, NLU 220, and/or the user-related service 250.

Different approaches can be used to trigger the ML transformer processing. Generally, the earlier this processing can start, the higher the improvements are to the user perceived latency. In one approach, illustrated with a solid arrow between the output of the ASR 210 and the input of the ML transformer 230, the text 212 is input to the ML transformer 230 as soon as being output from the ASR 210. For example, when the text 212 is generated, an API call can be made to the ML transformer 230, where this API call includes the text 212. In another approach, illustrated with a first dotted arrow from the center rectangle representing the NLU 220 to the input of the ML transformer 230, the text 212 is input to the ML transformer 230 following some, but not all, processing of the NLU 220. For instance, upon determining that the user-related service 250 will be invoked and prior to completing the NLU processing of the text 212, an API call can be made to the ML transformer, where this API call includes the text 212. Here, the overall user perceived latency may not be as improved as in the first approach. However, less processing burden is imposed because the ML transformer processing is invoked on an as-needed basis. In yet another approach, illustrated with a second dotted arrow between the output of the NLU 220 and the input of the ML transformer 230, the text 212 is input to the ML transformer 230 after completion of the NLU processing. A similar API call can be made only if the ML transformed processing is needed. Here, the improvement to the user perceived latency is the least among the three approaches.

Upon receiving the text 212, the ML transformer 230 generates embedding vectors and metadata 232 therefrom. An embedding vector can be generated, via transformation layers of the ML transformer 230, from one word, a subset of the words, or the full set of the words in the text 212. The metadata associated with the embedding vector includes information about this embedding vector, where this information represents an association between the embedding vector and the text (or, more specifically, the relevant portion of the text). For instance, the metadata includes the word(s) for which the embedding vector is generated, the position(s) of the word(s) in the text 212, the full text 212 (e.g., to facilitate subsequent querying), an identifier of the audio data 202 or corresponding user utterance (e.g., to also facilitate subsequent querying), and/or a timestamp for when the text 212 was generated or received (e.g., to also facilitate subsequent querying).

The embedding vectors and metadata 232 are stored in the data store 240. The data store 240 can store sets of embedding vectors, each corresponding to a particular user utterance or corresponding audio data or text. In this case, each set can be associated with an identifier of the user utterance, audio data, or text to facilitate the subsequent querying.

Upon receiving the task data 252 from the user-related service 250, the MTL 260 (or a related querying service) can generate and send a query 262 to the data store 240 to retrieve the relevant embedding vector(s) for processing.

The query 262 can include the identifier associated with the set of embedding vectors. Additionally, different types of data can also be included in the query 262 depending on the task data 252. In one illustration, the task data 252 indicates that a particular ML task is needed, where this ML task is pre-associated with a particular utterance length (e.g., for intent classification, the full utterance is needed, which corresponds to the full set of words in the text). In this case, the query 262 indicates that the query results should return embedding vectors generated for a number of words that corresponds to the particular utterance length (e.g., in the case of intent classification, the query 262 would request the embedding vector generated for the entire text 212). In another illustration, the task data 252 includes words. In this case, the query 262 also includes these words. In yet another illustration, the task data 252 includes position information (e.g., the positions of the words or their slot identifiers). Here also, the query 262 includes the position information.

The data store 240 (e.g., a querying engine thereof) return the embedding vector(s) 242 that match(es) the query 262. The embedding vector(s) 242 is (are) input to the MTL 260. Upon processing the embedding vector(s) 242, the MTL 260 generates task output data 264. The task output data 264 can correspond to the different ML tasks that were performed and can be sent back to the user-related service 250 and/or can be provided to other user-relates services. For instance, the task output data 264 can indicate an intent classification, a named entity, and/or a sentiment.

Although FIG. 2 illustrates that text 212 is generated from audio data 202 and embedding vectors and metadata 232 are generated from the text 212, the embodiments of the present disclosure are not limited as such. Instead, text can be received from other sources and processed in conjunction with or separately from the text 212. For example, text can be received from an account associated with a user for which the audio data 202 was detected. This text can relate to user preferences, user settings, history of online interactions, and the like and can be referred to as additional text. The additional text can be added to the text 212 to generate augmented text. The augmented text can then be input to the ML transformer 230. Alternatively, the additional text is input to the ML transformer 230 separately from the text 212. In turn, the ML transformer 230 outputs additional embedding vectors (and the related metadata) that correspond to the additional text. These additional embedding vectors can be stored in the data store 240 and/or can be concatenated with the embedding vectors of the text 212 to then generated concatenated embedding vectors that are stored in the data store 240.

To illustrate, the text 212 can relate to a user request (e.g., "I will have a veggie pizza tonight"). The additional text can relate to a user-preferred service provider and/or a user preference for meeting the request (e.g., "pizza from store XYZ" "pizza toppings of mushrooms, peppers, and olives"). In this illustration, an embedding vector can be generated from some or the entire portion of the user request and from some or the entire portion of the user-preferred service provider and/or a user preference.

Likewise, the text 212 can be processed before input to the ML transformer 230. The processed text can be input in conjunction with (e.g., as augmented text) or separately from the text 212. The processing can include removing, replacing, and/or adding one or more words of the text 212.

To illustrate, the text 212 can relate to a user request (e.g., "I will have a veggie pizza tonight"). The processed text can replace some of the words with equivalents. For instance, "veggie" and "tonight" can be replaced with "vegetarian" and "this evening".

Furthermore, although FIG. 2 illustrates querying the data store 240 for stored embedding vectors, other data stores may be similarly queried to receive additional embedding vectors. The retrieved embedding vectors from the data store 240 and other data store(s) can be concatenated and input to the MTL 260 or can be input separately to the MTL 260. For example, embedding vectors may have been generated from additional text available from an account associated with a user and stored in another data store. Like the above example, the additional text can relate to user preferences, user settings, history of online interactions. An embedding vector 242 received from the data store 240 upon a query 262 and an additional embedding vector receives from the other data store upon an additional query can be concatenated and the concatenated embedding vector is input to the MTL 260.

To illustrate, the text 212 can relate to a user request (e.g., "I will have a veggie pizza tonight"). The additional text can relate to a user-preferred service provider and/or a user preference for meeting the request (e.g., "pizza from store XYZ" "pizza toppings of mushrooms, peppers, and olives"). In this illustration, an embedding vector corresponding to some or the entire portion of the user request can be concatenated with an embedding vector of some or the entire portion of the user-preferred service provider and/or a user preference to then perform one or more tasks (e.g., determine intent to purchase pizza, recognize the pizza store, and predict the desired pizza toppings).

Figure 3:
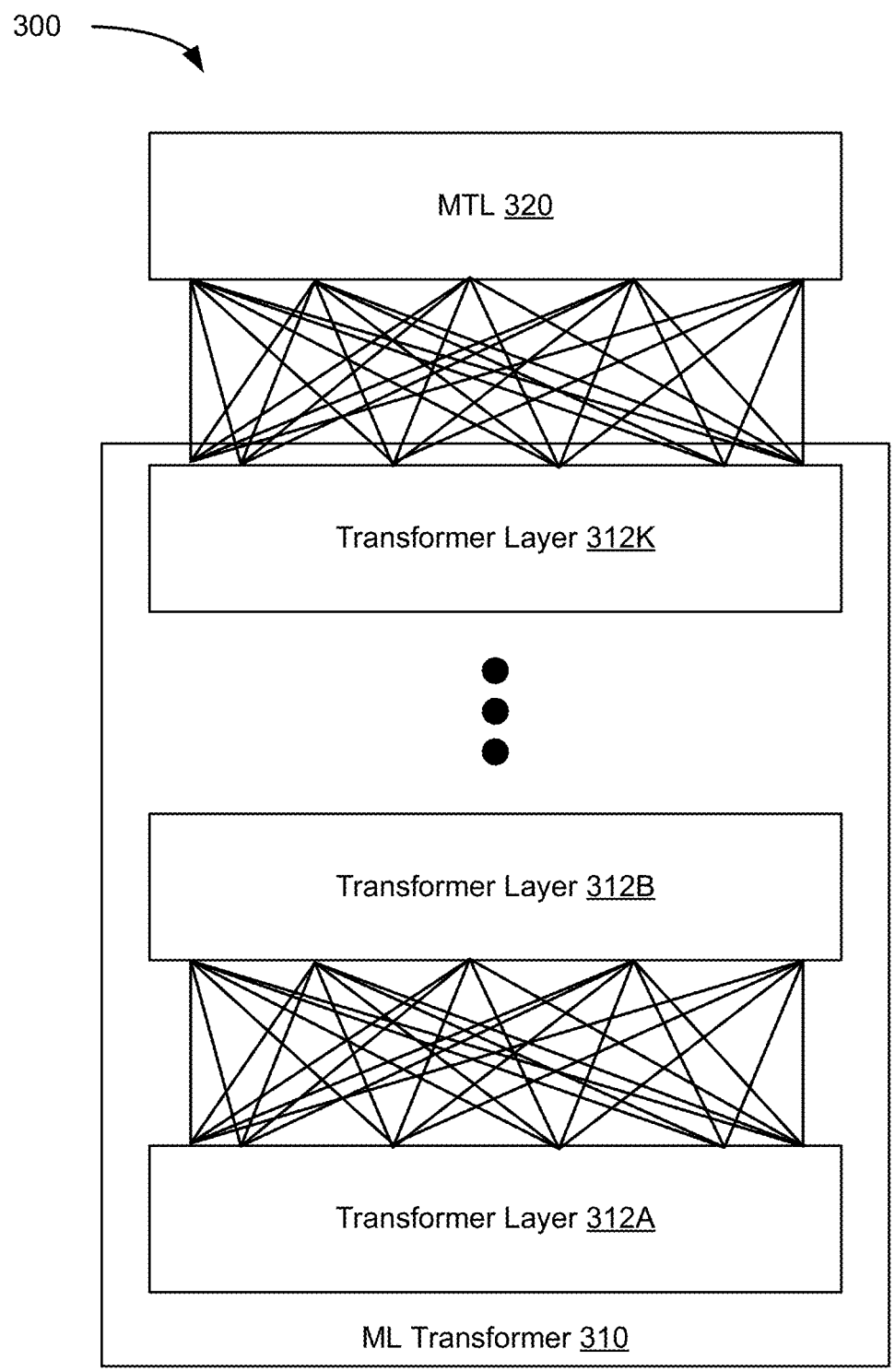
FIG. 3 illustrates an example of an artificial intelligence (AI) model that includes a machine learning (ML) transformer and a multi-task layer (MTL), according to embodiments of the present disclosure.

FIG. 3 illustrates an example of an AI model 300 that includes an ML transformer 310 and an MTL 320, according to embodiments of the present disclosure. Generally, the ML transformer 310 can be set up as an encoder that generates embedding vectors in response to input that includes text. The MTL 320 can perform multiple ML tasks, such as intent classification, named entity recognition, sentiment analysis, natural language input prediction, search continuity prediction, or ASR correction and the like in response to input that includes one or more of the embedding vectors.

In an example, the ML transformer 310 includes a deep learning model trained for natural language processing. For example, the ML transformer 310 can be a pre-trained system (e.g., using benchmark training text data), such as a Bidirectional Encoder Representations from Transformers (BERT), an optimized BERT (RoBERTa), a generative Pre-trained Transformer (GPT), and the like. Such models include a set of encoding layers, illustrated in FIG. 3, as transformation layers 312A, 312B, . . . , 312K, that process the input iteratively one layer after another one. The function of each encoder layer is to process its input via its nodes to generate encodings (e.g., embeddings), containing information about which parts of the inputs are relevant to each other. The encoding layer passes its set of encodings to the next encoder layer as inputs (FIG. 3 illustrates the connection between the nodes across the transformation layers). In the case of BERT, a base model can be used with twelve encoding layers, or a large model can be used with twenty-four layers.

For a particular input (e.g., a set of words from a text), the output of the ML transformer 310 is an embedding vector. The embedding vector is a vector of elements, each corresponding to a numeral representation of information learned about the input. The number of elements represent the embedding dimension. The embedding dimension can vary depending on a target task. For instance, the embedding dimension of vectors usable for intent classification can be smaller than that of embedding vectors usable for named entity recognition. In the case of a BERT model, the embedding dimension for intent classification can be seven-hundred sixty-eight, whereas that for named entity recognition can be larger. The embedding dimension can be set as a hyperparameter used in the training of the AI model 300 across different tasks.

The MTL 320 can be a deep learning layer set up for multi-tasking. The ML tasks can be learned jointly, during the training of the AI model 300. Although the MTL 320 is illustrated as included in a single layer, it can include additional layers (e.g., hidden layers). Given a text input to ML transformer 310, an embedding vector is output therefrom to the MTL 320. In turn, the MTL 320 performs one or more of the ML tasks (e.g., outputs an intent classification, named entity, and/or a sentiment identifier).

An ML task represents a prediction, classification, or any other type of inference that the MTL 320 may perform based on the output of the ML transformer 310. Intent classification, named entity recognition, sentiment analysis, natural language input prediction, search continuity prediction, and ASR correction are examples of ML tasks. For intent classification, the MTL 320 can classify whether an intent, as represented by the output of the ML transformer 310, belongs to particular classification, such as an intent to complete an online purchase, an intent to stream media, an intent to schedule an event, and the like. For named entity recognition, the MTL 320 can recognize a named entity, as represented by the output of the ML transformer 310, such as a brand of a product, a type of the product, and the like. For sentiment analysis, the MTL 320 can predict a sentiment or a feeling, as represented by the output of the ML transformer 310, such as whether a user is happy, sad, and the like. For natural language input prediction, the MTL 320 can predict a possible next sentence, text, or utterance of a user based on the current text as, as represented by the output of the ML transformer 310. This type of task can also be referred to as sequence-to-sequence prediction. For search continuity prediction, the MTL 320 can predict whether the current text (or, more broadly, natural language input or utterance related to a search), as represented by the output of the ML transformer 310, relates to a pervious search for which text (or, more broadly, natural language input or utterance related to the search) may have been processed and/or for which a context of the previous may be relevant. For ASR correction, the currently processed text may have been generated by performing ASR on audio data. In this case, the MTL 320 can predict a correction to the outputs of the ASR processing based on the text, as represented by the output of the ML transformer 310, so that corrected text can be generated.

Figure 4:
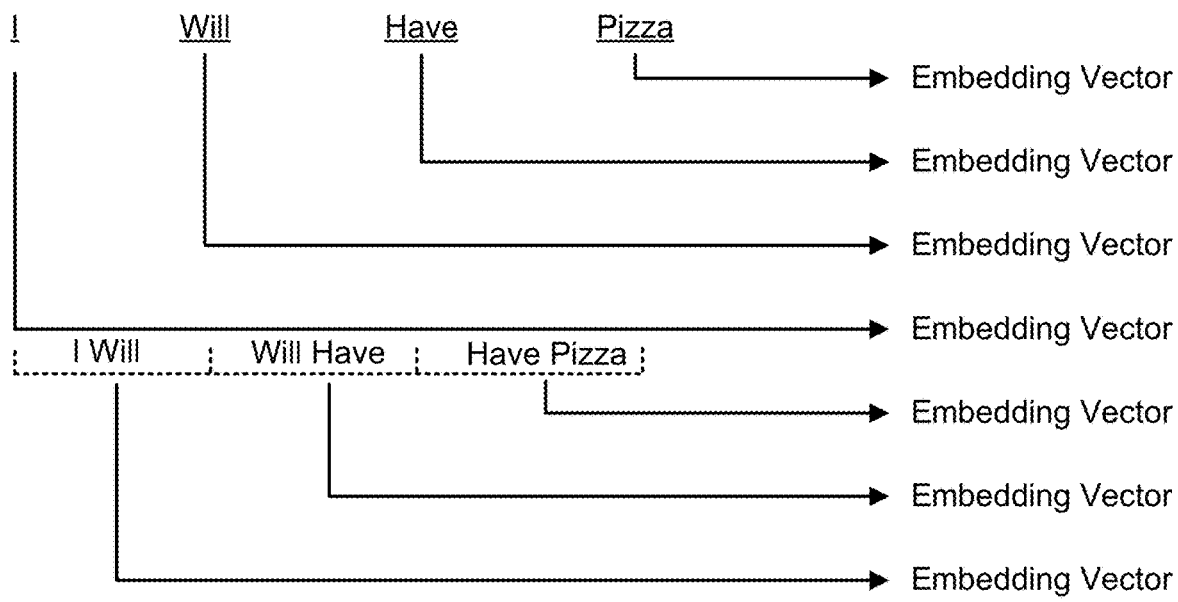
FIG. 4 illustrates an example of generating embedding vectors from text, according to embodiments of the present disclosure.
Figure 4:

FIG. 4 illustrates an example of generating 400 embedding vectors from text, according to embodiments of the present disclosure. Each embedding vector represents a word embedding a set of words from the text, such as a learned representation of these words in an embedding space. In the interest of clarity of explanation, a particular text is illustrated in FIG. 4 (e.g., I Will Have Pizza). However, the embodiments are not limited to this illustrative example or to the particular number of words or arrangement of the words.

In an example, the text is formed by a number of words, each having a position in the text. FIG. 4 illustrates four words, where "I" is at the first position (e.g., slot ID "1"), "Will" is at the second position (e.g., slot ID "3"), "Have" is at the third position (e.g., slot ID "3"), and "Pizza" is at the fourth position (e.g., slot ID "4").

An embedding vector can be generated from a subset of the words or a full set of the words. In other words, there can be an embedding vector per word (e.g., an embedding vector is generated for each of "I," "Will," "Have," Pizza"). Adjacent words can be combined and their combination can be represented by an embedding vector (e.g., an embedding vector is generated for each of "I Will, "Will Have," "Have Pizza," "I Will Have," "Will Have Pizza," and "I Will Have Pizza"). Non-adjacent words may, but need not, be combined to then generate a representative embedding vector (e.g., there may be an embedding vector for "I Have" or "Will Pizza").

An embedding vector generated for a set of words can be associated with metadata. The metadata includes information about the words and/or the positions of the words in the text. For instance, for an embedding vector generated for "Pizza," the associated metadata can include the word "Pizza" and/or slot ID "4." In comparison, for an embedding vector generated for "I Will Have Pizza," the associated metadata can include the words "I Will Have Pizza" and/or slot IDs "1, 2, 3, 4."

The set of embedding vectors illustrated in FIG. 4 can be associated with the full text (e.g., "I Will Have Pizza"), the audio data, if any, from which the text was generated, and/or the user input (e.g., the user utterance that resulted in the audio data). This association can also be included in the metadata of each embedding vector to facilitate subsequent querying.

Figure 5:
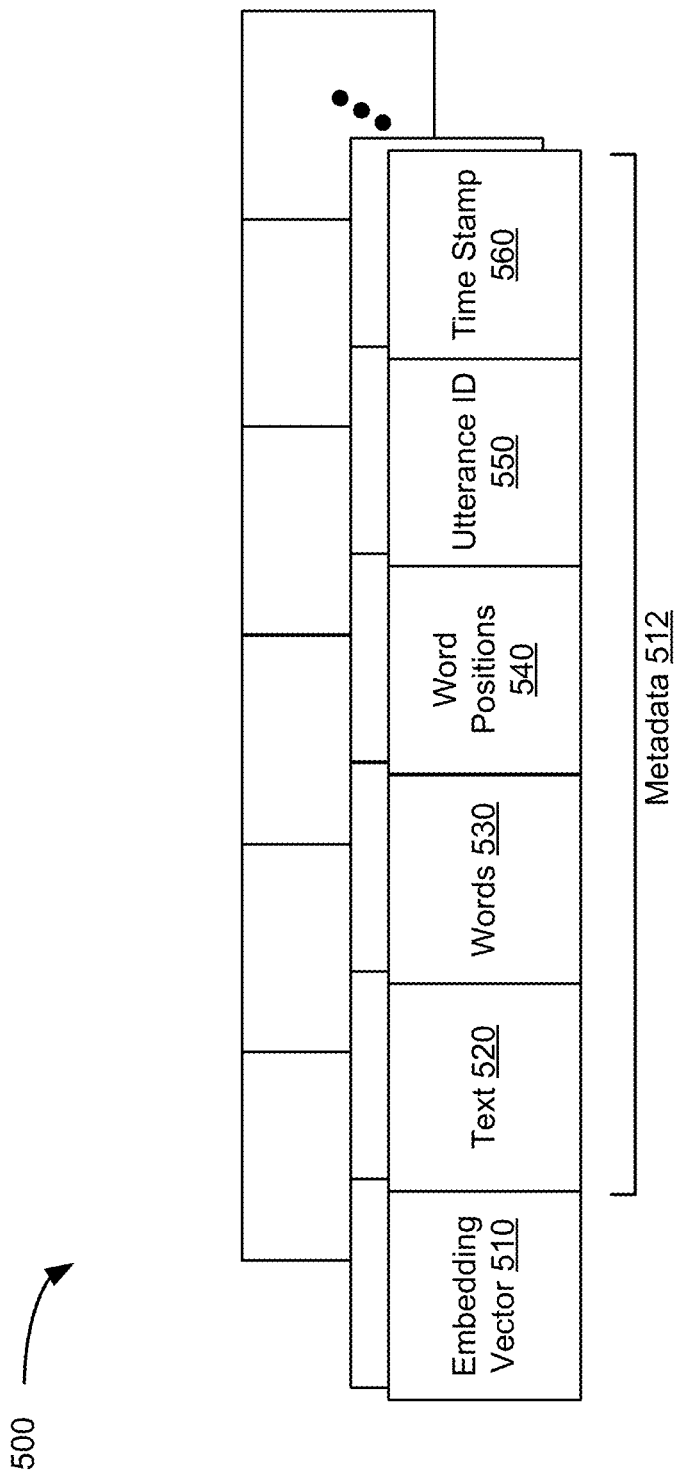
FIG. 5 illustrates an example of storing embedding vectors and related metadata, according to embodiments of the present disclosure.

FIG. 5 illustrates an example of storing 500 embedding vectors and related metadata, according to embodiments of the present disclosure. In an example, the embedding vectors are generated from the same text and are associated therewith (or with the corresponding audio data/user utterance). Each embedding vector has also metadata that includes the association to the text and other information about the embedding vector, as explained herein above. The embedding vector 510 and the metadata 512 can be stored in a data store using a data structure such as a relational database or more simply like a row in a matrix, an entry in a table, two sets of string, a single string, and the like.

In an example, an embedding vector 510 and metadata 512 about the embedding vector are stored. The metadata 512 includes the full text 520, the words 530 that are included in the text 520 and that are used to generate the embedding vector 510, word positions 540 indicating the positions of these words 530 in the text 520, an utterance identifier 550 that associates the embedding vector 510 with a user utterance from which the text 520 was derived, and/or a time stamp 560 indicating the timing of when the user utterance was detected or of when the text 520 was received. Similar data can be stored for each of the remaining embedding vectors generated using different sets of words from the text 520.

Figure 6:
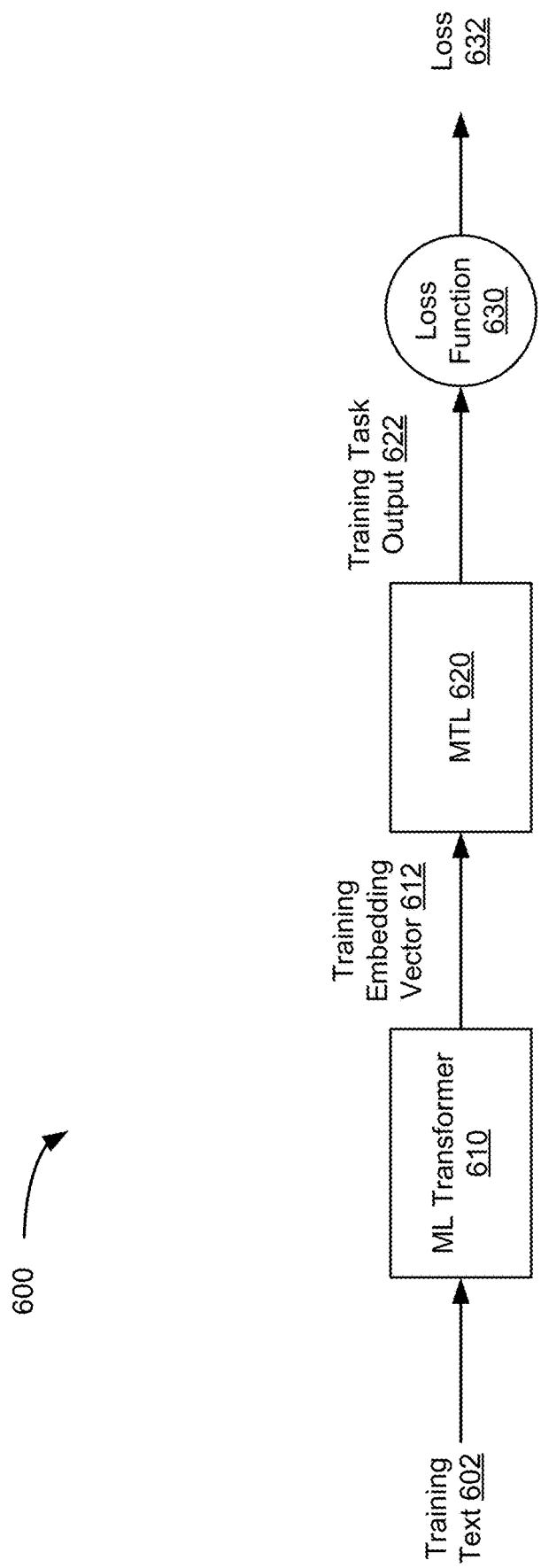
FIG. 6 illustrates an example of training an AI model that includes an ML transformer and an MTL, according to embodiments of the present disclosure.

FIG. 6 illustrates an example of training 600 an AI model that includes an ML transformer 610 and an MTL 620, according to embodiments of the present disclosure. The training of the ML transformer 610 and MTL 620 can be performed jointly. Further, the training of the MTL 620 across the different ML tasks can also be performed jointly.

In an example, the ML transformer 610 (e.g., BERT, RoBERTa, or GPT) is pre-trained using benchmark training text. In this example, the training 600 includes fine tuning parameters of the ML transformer 610 given training text 602 specific to a service provider and/or to the multiple ML tasks.

The training text 602 can include text that was previously collected and that relate to the ML tasks. For instance, and referring to the example of online shopping and ML tasks of intent classification, named entity recognition, and sentiment analysis, the training text 602 can include text used by various online shoppers to browse and search for items online, purchase and/or return such items, describe online purchase experience, and/or provide a consumer review. The training text 602 can also be annotated such that by associating training label therewith. A training label can indicate a ground truth (e.g., the expected ML task output). For instance, a text of "order me running shoes" can be labeled as "purchase intent" for the intent classification task, "sports shoes" for the named entity recognition task, and "upbeat" for the sentiment analysis task. The text may be associated with the different ML tasks, or can be specific to and have a training label for a particular ML task (e.g., "I feel great today" may be specific to only the sentiment analysis task).

The training text 602 is input to the ML transformer. For each input text, the ML transformer 610 generates a set of training embedding vectors, each corresponding to a different set of the words from this text. The resulting training embedding vectors 612 are input to the MTL 620 that generates, from each input training embedding vector, a training task output 622. This output includes output data of the different ML tasks (e.g., the intent classification, named entity, and sentiment for an input training embedding vector). Of course, the input/output process can be in batches, where, for example, one text is input to the ML transformer 610. Thereafter, the resulting embedding vectors are sequentially input to the MTL 620, which generates a training task output per input. Once the parameters of the ML transformer 610 and the MTL 620 are updated, the next text can be input to the ML transformer 610, and so on and so forth.

When a training task output 622 is generated from a particular text, this output 622 can be compared to the ground truth label that corresponds to the text to then update a loss function 630 and compute a loss 632. Because the training is performed jointly for the different ML tasks, the loss function can be a weighted sum of individual loss functions, each corresponding to one of the ML tasks. An individual loss of an ML task can be the difference between the output data of this ML task and the corresponding ground truth indicated for the ML task in the training label. For instance, for the text "order me running shoes," a training embedding vector is input to the MTL 620 that, in turn, outputs an intent classification of "return intent," a named entity recognition of "sports shoes," and a sentiment of "upbeat." The ground truth label for this text is "purchase intent," "sports shoes," and "upbeat". Hence, the individual loss function for the intent classification is increased, whereas the individual loss functions for the named entity recognition and the sentiment analysis are decreased. The resulting loss 632 can be an equal summation of these three losses (e.g., the weight of each individual loss is one).

The weights to use in the loss function 630 can vary depending on the ground truth labels. For instance, and referring back to the "I feel great" text, the ground truth label can be "inapplicable" for the intent classification, "inapplicable" for the named entity recognition, and "great" for the sentiment analysis. Accordingly, when the individual losses are summed, the first two individual losses can be multiplied by zero (e.g., removed) or a small ratio, whereas the individual loss function for the sentiment analysis can be multiplied by one or a large ratio.

Once the loss 632 is computed, the parameters of the ML transformer 610 and the MTL 620, such as the weights of their nodes, can be updated using, for instance, a backpropagation algorithm. This update can be performed iteratively across the particular text and the different training text 602, with the goal of minimizing the loss function 630.

In an example, different hyperparameters can be controlled during the training 600. for instance, the embedding dimensions can be varied. In particular, the embedding dimension for an embedding vector generated from a text specific to a particular ML task (e.g., for text specific to intent classification) can be made different from that of embedding vector generated from a text specific to another ML text (e.g., for text specific to sentiment analysis).

In another example of the hyperparameters, the length of the text from which embedding vectors can be generated can be a hyperparameter. In this way, the training 600 allows defining a length range (e.g., a minimum and a maximum length). If at the inference stage, a text is shorter than the lower bound of the length range, padding can be performed by adding words to the text. Conversely, if at the inference stage, a text is longer than the upper bound of the length range, chopping can be performed by removing words from the text.

Figure 7:
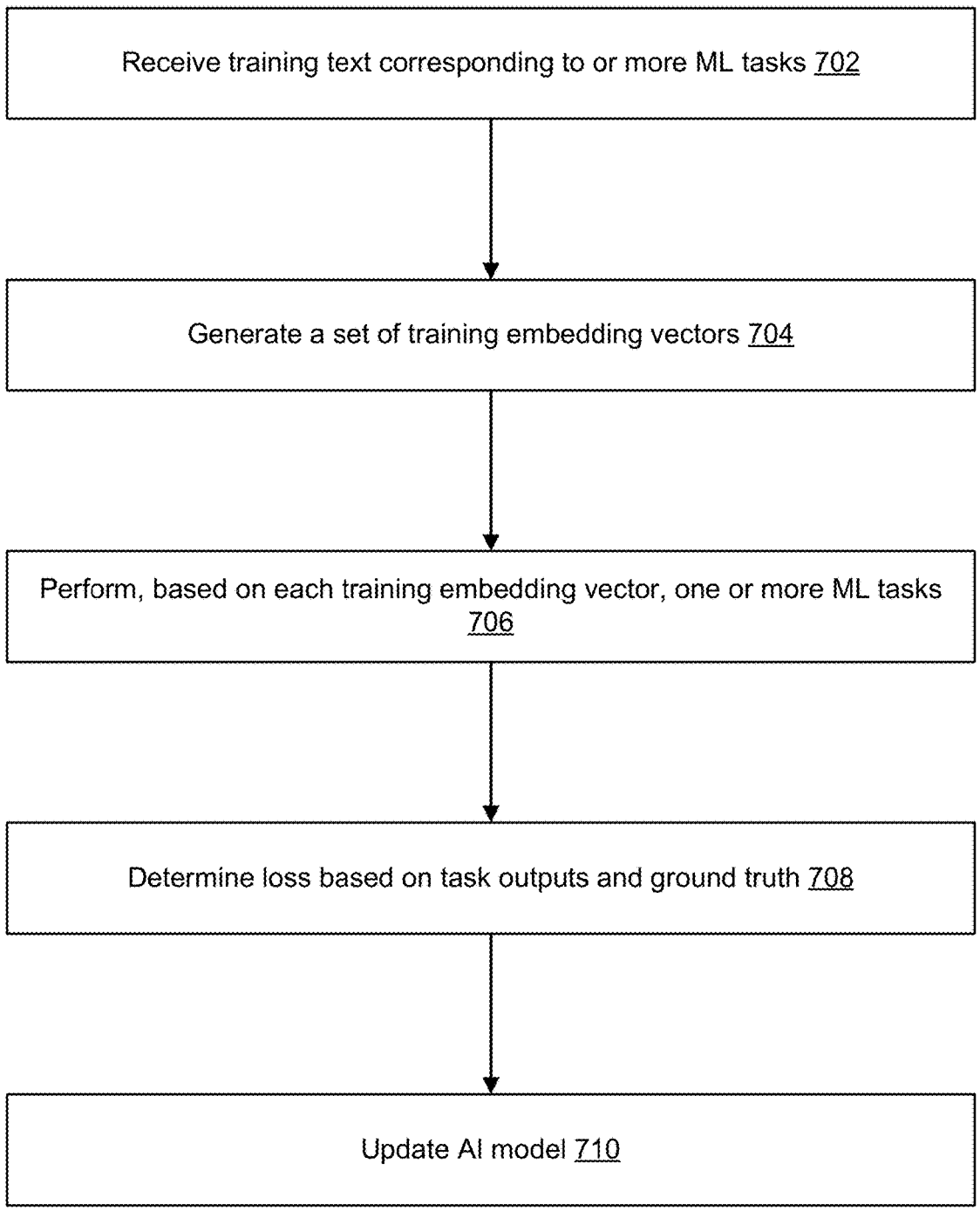
FIG. 7 illustrates an example of a flow for training an AI model that includes an ML transformer and an MTL, according to embodiments of the present disclosure.
Figure 8:
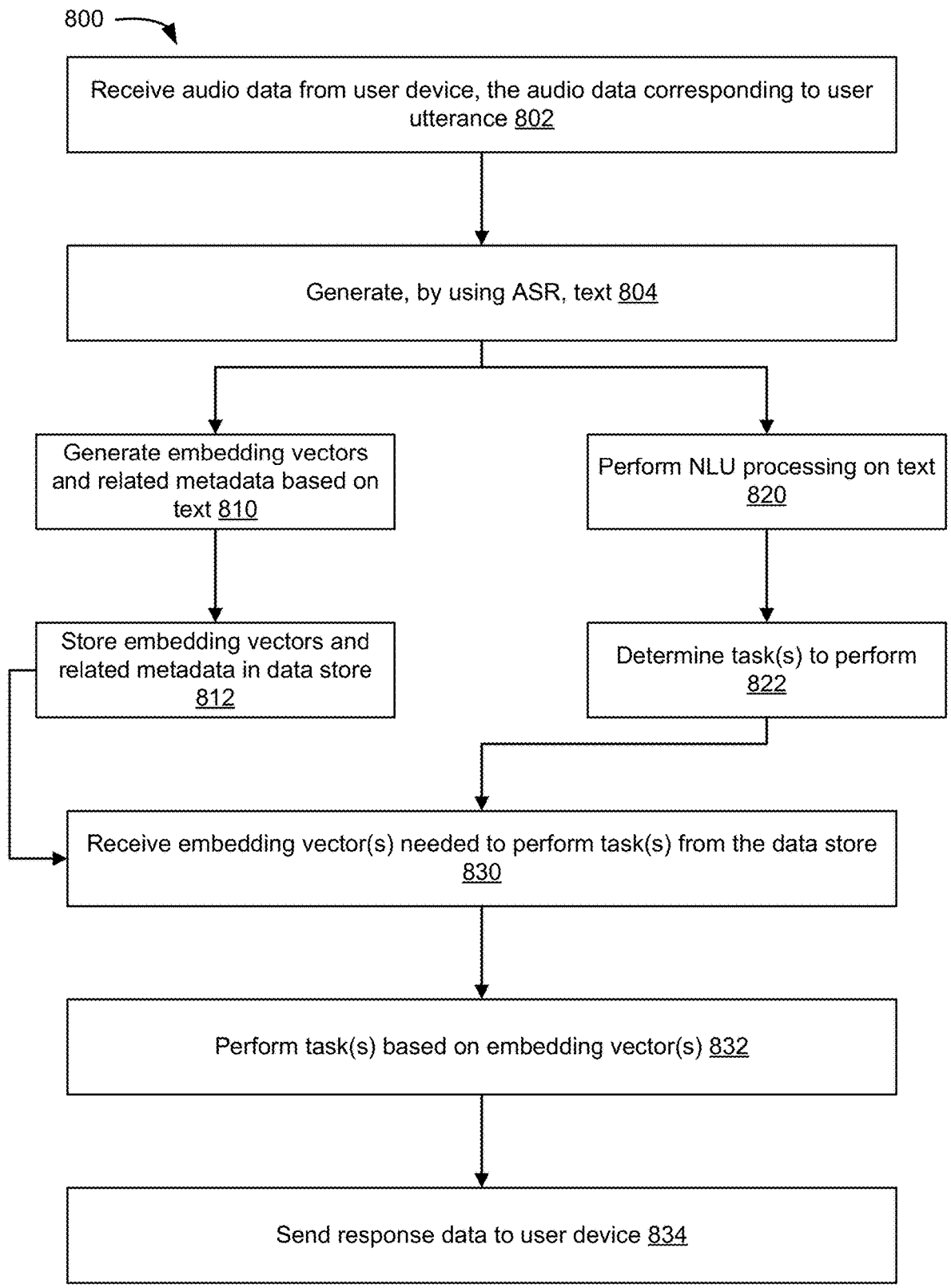
FIG. 8 illustrates an example of a flow for natural language processing that involves pre-computing embedding vectors and subsequently using one or more of the embedding vectors, according to embodiments of the present disclosure.

FIGS. 7-8 show illustrative flows related to natural language processing. Some or all of the instructions for performing the operations of the illustrative flows can be implemented as hardware circuitry and/or stored as computer-readable instructions on a non-transitory computer-readable medium of a computer system, such as the computer system 110 of FIG. 1. The same computer system or different computer systems can be used for the flows. As implemented, the instructions represent modules that include circuitry or code executable by a processor(s) of the computer system. The use of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, and/or reordered.

FIG. 7 illustrates an example of a flow 700 for training an AI model that includes an ML transformer and an MTL, according to embodiments of the present disclosure. As illustrated, the flow 700 may start at operation 702, where the computer system receives a training task corresponding to one or more ML tasks. For example, the training text can be collected by a service provider via an online platform that provides user computing services. Referring to the example of an electronic marketplace platform, the text can be natural language input of a user requesting a particular shopping service (e.g., "order me running shoes"). The training text can be associated with a ground truth label indicating how the training task is associated with the ML task(s) (e.g., the ground truth label may be "purchase intent," "sports shoes," and "upbeat" indicating that the expected output of an intent classification task is for the "purchase intent," the expected output of a named entity recognition task is the "sports shoes" entity, and the expected output of a sentiments analysis task is the "upbeat" sentiment).

At operation 704, the computer system generates a set of training embedding vectors. For instance, and referring back to FIG. 4, different combinations of words from the text can be generated. Each combination can be input to an ML transformer that was pre-trained using benchmark training text. The output of the ML transformer is the set of embedding vectors.

At operation 706, the computer system performs, based on each training embedding vector, one or more ML tasks. For instance, a first training embedding vector from the set is input to an MTL. The MTL generates, per ML task, output data indicating the output of performing the ML task. To illustrate, the MTL generates an intent classification of "return intent," a named entity recognition of "sports shoes," and a sentiment of "upbeat."

At operation 708, the computer system determines a loss based on task outputs and the ground truth associated with the training task. For example, the output data generated at operation 706 can be compared to data from the ground truth (e.g., ground truth data). The difference between the output data and the ground truth data represents a loss. The larger the difference, the larger the loss is. The loss can be computed per ML task to determine an individual loss, and a weighted sum of the individual losses can be used to derive a total loss. The weights can depend on the ground truth labels too. For instance, and referring to the example output data illustrated at operation 706, the individual loss for the intent classification is increased, whereas the individual losses for the named entity recognition and the sentiment analysis are decreased. The resulting total loss can be an equal sum of these three losses (e.g., the weight of each individual loss is one) given that the training text is associated with all three ML tasks.

At operation 710, the computer system updates the AI model that includes the ML transformer and the MTL. The update can rely on a backpropagation algorithm to fine tune the parameters the ML transformer and the MTL such that the loss is minimized. Operations 710 and 708 can be iteratively repeated across the different embedding vectors, operations 706-710 can be repeated across different epochs, and operation 702-710 can be repeated across different training texts.

FIG. 8 illustrates an example of a flow 800 for natural language processing that involves pre-computing embedding vectors and subsequently using one or more of the embedding vectors, according to embodiments of the present disclosure. Here, an AI model has already been trained (e.g., per the flow 700 of FIG. 7) and includes an ML transformer and an MTL.

In an example, the flow starts at operation 802, where the computer system receives audio data from a user device. The audio data corresponds to a user utterance detected by the user device. For instance, the user device includes an application that generates the audio data. The audio data is sent over one or more data networks to the computer system. An utterance processor of the computer system receives the audio data for processing.

At operation 804, the computer system generates, by using ASR on the audio data, text. For instance, the audio data is input to an ASR process that converts the audio into an arrangement of words that form the text.

At operation 810, the computer system generates embedding vectors and related metadata based on the text. Operation 810 can be performed as soon as the text is generated or prior to NLU processing. Nonetheless, operation 810 can be rearranged such that it is invoked during the NLU processing or, alternatively, after the NLU processing. In an example, the computer system generates combinations of words from the text. Each combination is input to the ML transformer that generates the corresponding embedding vectors. The computer system tracks the word combination and the word position information per embedding vector and this tracked data can be included in the metadata.

During the training of the AI model, a length range can be derived. Accordingly, upon receiving the text, the computer system can determine its length (e.g., by counting the number of words included therein). The length is compared to the length range. The computer system can edit the text based on this comparison. For instance if the text is shorter than the lower bound of the length range, padding can be performed and can involve one or more word additions such that the length is increased to be equal to at least the minimum bound. The padding can randomly select a word from the text for addition. Additionally or alternatively, the padding can randomly select a common, non-weighted word from a candidate set (e.g., "a", "the," "I", "have," etc.) for addition. Conversely, if the text is longer than the upper bound of the length range, chopping can be performed by removing words from the text. A word from the text can be randomly selected and removed. A word at a particular positon (e.g., the start or the end of the text) can be selected or removed or a word found in the text and the candidate set can be selected and removed.

At operation 812, the computer system stores the embedding vectors and related metadata in a data store. For instance, each embedding vector is associated with the text and/or the user utterance. This association is stored in the metadata. Additionally or alternatively, the metadata can store an association of the embedding vector with the particular words from which the embedding vector is generated and/or positions of these words in the text. Any data structure including a relational database, a matrix, an array, a string, and the like can be used.

At operation 820, the computer system performs NLU processing on the text. As a result, the computer system generates machine-readable format understanding of the text.

At operation 822, the computer system determines that a task(s) (e.g., an ML task(s)) is to be performed. For instance, based on the machine-readable format understanding, the computer system determines that a particular user-related service is to be invoked. To execute the user-related service and provide the relevant computing service may necessitate one or more ML tasks to be performed (e.g., intent classification, named entity recognition, and/or sentiments analysis). These ML tasks may be pre-associated with the user-related service. Accordingly, based on the determination that the user-related service is to be performed and the pre-associations with the ML task(s), the computer system can identify the relevant ML task(s).

At operation 830, the computer system receives embedding vector(s) needed to perform the ML task(s) from the data store. In an example, at least one embedding vector is needed for an ML task. The selected user-service may output task data indicating the needed task, the relevant words, and/or the positions of the relevant words. A particular ML task can be associated with a particular text length. In this case, the computer system sends a query to the data store identifying a user utterance (e.g., the utterance ID can be received from the user-related service) and/or the text (e.g., the text can also be received from the user-related service) requesting query results that include embedding vectors generated for the number of words equal to the text length. For instance, for intent classification, the entire text is needed. In this illustration, the query can request that only the embedding vector generated for the entire text is returned. In another illustration, the data from the user-selected service can identify the words. In this case, the query identifies the words. Similarly, the data from the user-selected service can identify the positions of the words. In this case, the query identifies the positions.

At operation 832, the computer system performs the ML task(s) based on the embedding vector(s). For instance, each embedding vector received at operation 830 is input to the MTL that, in turn, processes the embedding vector to output ML task data (e.g., an intent classification, named entity recognition, or a sentiment).

At operation 834, the computer system sends response data to the user device. For instance, the ML task data becomes input to the user-related service that, in turn, provides the relevant computing service. The response data can identify aspects of the computing service and can be presented at the user device (e.g., the user device can play a TTS indicating an online purchase).

Figure 9:
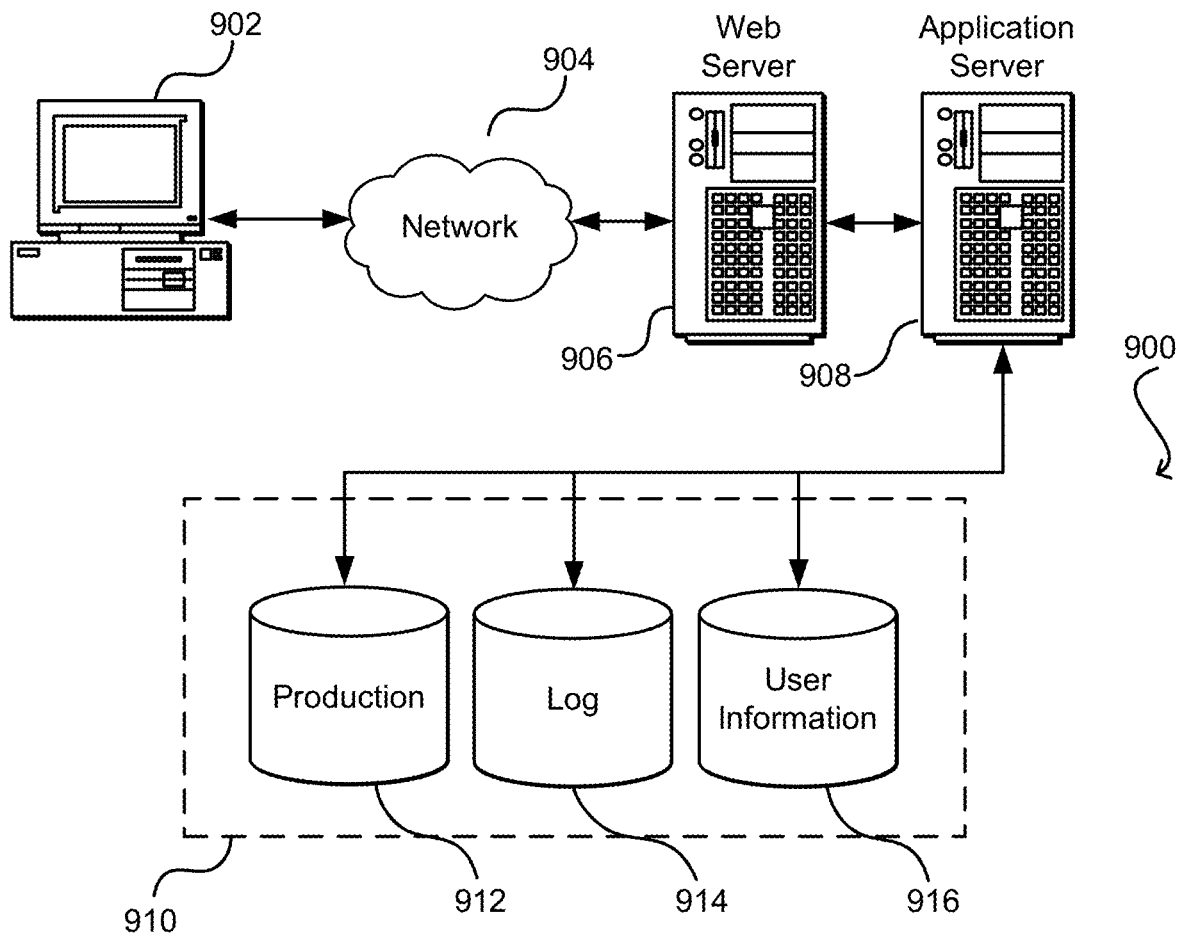
FIG. 9 illustrates aspects of an example environment for implementing aspects in accordance with various embodiments.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

What is claimed is:

1. A method implemented on a computer system, the method comprising:
   receiving, from a user device, audio data that corresponds to a user utterance detected by the user device;
   generating text by performing automatic speech recognition (ASR) on the audio data;
   inputting the text to a machine learning (ML) transformer of an artificial intelligence (AI) model, the ML transformer trained to generate embeddings;
   storing, in a data store, an embedding vector and an association between the embedding vector and at least a portion of the text, the embedding vector generated by the ML transformer for the at least portion of the text;
   determining, by performing natural language understanding (NLU) on the text, that a task is to be performed based at least in part on the at least portion of the text, the task comprising one or more of: intent classification, named entity recognition, sentiment analysis, natural language input prediction, search continuity prediction, or ASR correction;
sending a query to the data store based at least in part on the task;
receiving, from the data store in response to the query, the embedding vector based at least in part on the association between the embedding vector and the at least portion of the text;
performing the task by inputting the embedding vector to a multi-task layer (MTL) of the AI model, the MTL trained to perform multiple tasks; and
sending, to the user device, data based at least in part on performance of the task.

2. The method of claim 1, further comprising:
determining a word from the text, wherein the at least portion of the text comprises the word;
determining a position of the word in the text; and
storing, in the data store, metadata for the embedding vector, wherein the metadata indicates the association and comprises the position of the word and an identifier of the user utterance.

3. The method of claim 2, further comprising:
generating the query based at least in part on a determination that performing the task depends on information associated with the position in the text, wherein the query indicates the position and the identifier of the user utterance, wherein the embedding vector is received based at least in part on the metadata associating the position with the embedding vector and on the identifier of the user utterance.

4. The method of claim 1, further comprising:
storing, in the data store, a first embedding vector and a second embedding vector, wherein an output of the ML transformer comprises the first embedding vector and the second embedding vector, wherein the first embedding vector corresponds to a set of words from the text and is usable to perform a first task of the multiple tasks, and wherein the second embedding vector corresponds to a different set of words from the text and is usable to perform a second task of the multiple tasks.

5. A computer system comprising:
one or more processors; and
one or more memories storing computer-readable instructions that, upon execution by the one or more processors, configure the computer system to:
generate, by using a machine learning (ML) transformer, an embedding vector based at least in part on text, the embedding vector generated prior to performing natural language understanding (NLU) processing on the text;
store the embedding vector and an association between the embedding vector and the text in a data store;
determine that a task is to be performed based at least in part on the NLU processing of the text;
send, based at least in part on the task, a query to the data store;
receive, in response to the query, the embedding vector from the data store based at least in part on the association between the embedding vector and the text; and
perform the task based at least in part on the embedding vector after being received from the data store.

6. The computer system of claim 5, wherein the one or more memories store further computer-readable instructions that, upon execution by the one or more processors, additionally configure the computer system to:

receive, from a user device, audio data that corresponds to a user utterance detected by the user device;
generate the text by at least performing automatic speech recognition (ASR) on the audio data;
input the text to the ML transformer, the ML transformer trained to generate embeddings;
input the embedding vector to a multi-task layer (MTL) of an AI model, the MTL trained to perform multiple tasks, wherein the AI model comprises the ML transformer; and
send, to the user device, data based at least in part on performance of the task.

7. The computer system of claim 5, wherein the embedding vector is a first embedding vector for a first set of words from the text, wherein the one or more memories store further computer-readable instructions that, upon execution by the one or more processors, additionally configure the computer system to:
generate a second embedding vector for a second set of words from the text; and
store, in the data store, the second embedding vector, wherein the association stored in the data store is an association between the first embedding vector and at least one of: the first set of words or position information of the first set of words in the text.

8. The computer system of claim 7, wherein the one or more memories store further computer-readable instructions that, upon execution by the one or more processors, additionally configure the computer system to:
determine that performing the task depends on information associated with the first set of words or the position information; and
send the query to the data store that indicates the first set of words or the position information, wherein the embedding vector is received in response to the query.

9. The computer system of claim 5, wherein the embedding vector is a first embedding vector for a first set of words from the text, wherein the task is a first task from multiple tasks of a multi-task layer (MTL) of an AI model that comprises the ML transformer, and wherein the one or more memories store further computer-readable instructions that, upon execution by the one or more processors, additionally configure the computer system to:
generate, by using the ML transformer, a second embedding vector for a second set of words from the text, wherein the first embedding vector is usable to perform the first task, and wherein the second embedding vector is usable to perform a second task.

10. The computer system of claim 9, wherein the first set of words is different from the second set of words, and wherein the association stored in the data store associates the first embedding vector with the first set of words or with positions of words from the first set in the text.

11. The computer system of claim 10, wherein the one or more memories store further computer-readable instructions that, upon execution by the one or more processors, additionally configure the computer system to:
determine that, to perform the first task, information corresponding to the positions is needed; and
generate the query that indicates the positions, wherein the first embedding vector instead of the second embedding vector is received in response of the query based at least in part on the positions.

12. The computer system of claim 9, wherein the first embedding vector has a first embedding dimension that is different from a second embedding dimension of the second embedding vector, and wherein the first embedding dimension is based at least in part on the first task.

13. The computer system of claim 5, wherein the task is a first task from multiple tasks of a multi-task layer (MTL) of an AI model that comprises the ML transformer, and wherein the ML transformer and the MTL are trained for the multiple tasks.

14. One or more non-transitory computer-readable storage media storing instructions that, upon execution on a computer system, cause the computer system to perform operations comprising:
- generating, by using a machine learning (ML) transformer, an embedding vector based at least in part on text, the embedding vector generated prior to performing natural language understanding (NLU) processing on the text;
- storing the embedding vector and an association between the embedding vector and the text in a data store;
- determining that a task is to be performed based at least in part on the NLU processing of the text;
- sending, based at least in part on the task, a query to the data store;
- receiving, in response to the query, the embedding vector from the data store based at least in part on the association between the embedding vector and the text; and
- performing the task based at least in part on the embedding vector after being received from the data store.

15. The one or more non-transitory computer-readable storage media of claim 14, storing further instructions, that upon execution on the computer system, cause the computer system to perform additional operations comprising:
- determining a length of the text; and
- editing, prior to inputting the text to the ML transformer, the text based at least in part on a comparison of the length to a length range, wherein the editing comprising a word addition or a word deletion.

16. The one or more non-transitory computer-readable storage media of claim 15, wherein the length range is set as a hyperparameter of the ML transformer during a training of the ML transformer.

17. The one or more non-transitory computer-readable storage media of claim 14, storing further instructions, that upon execution on the computer system, cause the computer system to perform additional operations comprising:
- generating a second embedding vector for a subset of words in the text, wherein the embedding vector is a first embedding vector generated for all words in the text.

18. The one or more non-transitory computer-readable storage media of claim 17, wherein the first embedding vector corresponds to a first task and has a first embedding dimension, wherein the second embedding vector corresponds to a second task and has a second embedding dimension different from the first embedding dimension.

19. The one or more non-transitory computer-readable storage media of claim 14, storing further instructions, that upon execution on the computer system, cause the computer system to perform additional operations comprising:
- storing, in the data store, metadata associated with the embedding vector, the metadata comprising: words that are included in the text and from which the embedding vector is generated, position information about the words in the text, and an identifier of an utterance from which the text is determined.

20. The one or more non-transitory computer-readable storage media of claim 14, storing further instructions, that upon execution on the computer system, cause the computer system to perform additional operations comprising:
- receiving, from a user device, audio data that corresponds to a user utterance detected by the user device;
- generate the text by at least performing automatic speech recognition (ASR) on the audio data;
- inputting the text to the ML transformer prior to performing the NLU processing on the text or completing the NLU processing of the text; and
- inputting, after completion of the NLU processing, the embedding vector to a multi-task layer (MTL) of an AI model, the MTL trained to perform multiple tasks, wherein the AI model comprises the ML transformer.

* * * * *